(12) United States Patent
Wu et al.

(10) Patent No.: US 8,484,403 B2
(45) Date of Patent: Jul. 9, 2013

(54) KVM SWITCH APPARATUS WITH BRIDGING FUNCTION

(75) Inventors: Hung-June Wu, Banciao (TW); Cheng-Sheng Chou, Banciao (TW)

(73) Assignee: June-On Technology Co., Ltd., New Taipei (TW)

( * ) Notice: Subject to any disclaimer, the term of this patent is extended or adjusted under 35 U.S.C. 154(b) by 310 days.

(21) Appl. No.: 12/878,910

(22) Filed: Sep. 9, 2010

(65) Prior Publication Data
US 2010/0332702 A1 Dec. 30, 2010

Related U.S. Application Data

(63) Continuation-in-part of application No. 12/396,650, filed on Mar. 3, 2009, now abandoned.

(51) Int. Cl.
*G06F 13/00* (2006.01)
(52) U.S. Cl.
USPC .............................. 710/316; 710/73
(58) Field of Classification Search
USPC ...................... 710/73, 74, 306, 316
See application file for complete search history.

(56) References Cited

U.S. PATENT DOCUMENTS

| | | | | |
|---|---|---|---|---|
| 6,557,170 B1* | 4/2003 | Wilder et al. | ............... | 725/130 |
| 6,671,756 B1* | 12/2003 | Thomas et al. | ............... | 710/73 |
| 7,028,110 B2* | 4/2006 | Seki et al. | ............... | 710/36 |
| 7,472,217 B2* | 12/2008 | Lou et al. | ............... | 710/316 |
| 8,176,226 B2* | 5/2012 | Hsueh et al. | ............... | 710/72 |
| 2006/0123182 A1* | 6/2006 | Sandulescu et al. | ............ | 710/316 |
| 2007/0074179 A1* | 3/2007 | Kwan | ............... | 717/136 |
| 2007/0257883 A1* | 11/2007 | Ke | ............... | 345/157 |
| 2008/0024433 A1* | 1/2008 | Gunther et al. | ............. | 345/156 |
| 2008/0198128 A1* | 8/2008 | Tsai et al. | ............... | 345/156 |
| 2009/0094395 A1* | 4/2009 | Shen | ............... | 710/74 |
| 2009/0210608 A1* | 8/2009 | Chang et al. | ............... | 710/316 |
| 2009/0288042 A1* | 11/2009 | Cheng | ............... | 715/856 |
| 2010/0013759 A1* | 1/2010 | Wu | ............... | 345/156 |
| 2010/0077335 A1* | 3/2010 | Cheng | ............... | 715/769 |
| 2011/0029896 A1* | 2/2011 | Cheng | ............... | 715/754 |

OTHER PUBLICATIONS

"KaVoom! KM User's Manual; Version 3.0"; KaVoom Software Inc.; 2007.*

* cited by examiner

*Primary Examiner* — Glenn A Auve
(74) *Attorney, Agent, or Firm* — Chun-Ming Shih; HDLS IPR Services (57) ABSTRACT

A KVM switch apparatus with bridging function includes a processor with a keyboard connection interface and a mouse connection interface; a keyboard/mouse switching circuit; a USB bridge unit and at least one computer interface unit electrically connected to at least one computer. The keyboard/mouse switching circuit and the USB bridge unit are selectively connected, whereby a switching of bridging channels is provided between at least two computers.

10 Claims, 11 Drawing Sheets

KVM SWITCH APPARATUS WITH BRIDGING FUNCTION

RELATED APPLICATIONS

This application is a continuation-in-part of U.S. patent application Ser. No. 12/396,650, filed on Mar. 3, 2009 now abandoned.

BACKGROUND OF THE INVENTION

1. Field of the Invention

The present invention relates a KVM (keyboard-video-mouse) switch apparatus with bridging function and enabling mouse cursor to move cross multiple monitors, especially to a KVM switch apparatus providing switching of bridging channels between any two computers and enabling mouse cursor to move cross multiple monitors.

2. Description of Prior Art

In the current KVM (keyboard-video-mouse) switch apparatus, each connection port is independent. Moreover, communication and resource-sharing channel (namely point to point connection) cannot be set up for various computers through the KVM switch apparatus. For data transmission application or other application requiring communication, external storage and additional interface are required. It is both increasing cost and troublesome for user.

Therefore, it is desirable to provide a KVM switch apparatus with bridging function and enabling mouse cursor to move cross multiple monitors to overcome above-mentioned drawbacks.

SUMMARY OF THE INVENTION

It is an object of the present invention to provide a KVM switch apparatus with bridging function, which provides switching of bridging channels between any two computers. Therefore, any two computers can establish point-to-point connection for resource sharing.

It is another object of the present invention to provide a KVM switch apparatus enabling mouse cursor to move cross multiple monitors.

Accordingly, the present invention provides a KVM switch apparatus with bridging function, which comprises a processor comprising a keyboard connection interface and a mouse connection interface; a keyboard/mouse switching circuit; a USB bridge unit and at least one computer interface unit electrically connected to at least one computer. The keyboard/mouse switching circuit and the USB bridge unit are selectively connected, whereby a switching of bridging channels is provided between at least two computers.

Accordingly, the present invention provides a KVM switch apparatus enabling mouse cursor to move cross multiple monitors, the KVM switch apparatus comprising a processor, a keyboard/mouse switching circuit, and computer interface units, the processor having a keyboard connection interface and a mouse connection interface and installed with a system driver, each of the computer interface units electrically connected to one corresponding computer, each computer having a monitor, the keyboard connection interface and the mouse connection interface electrically connected to a mouse and a keyboard, the KVM switch apparatus characterized in that:

when a mouse cursor is moved to a rightmost edge of a first monitor of a first computer connected to a first computer interface unit, the system driver sends an absolute address of the mouse cursor and an indication that the mouse cursor reaches the rightmost edge to the processor; and the processor controlling the keyboard/mouse switching circuit to connect to a second computer interface unit, and placing the mouse cursor to the leftmost edge of a second monitor of a second computer connected to the second computer interface unit, where the second monitor is on the right side of the first monitor. The mouse cursor can be move to third, four . . . monitor, and keyboard/mouse can auto switch with the cursor also.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
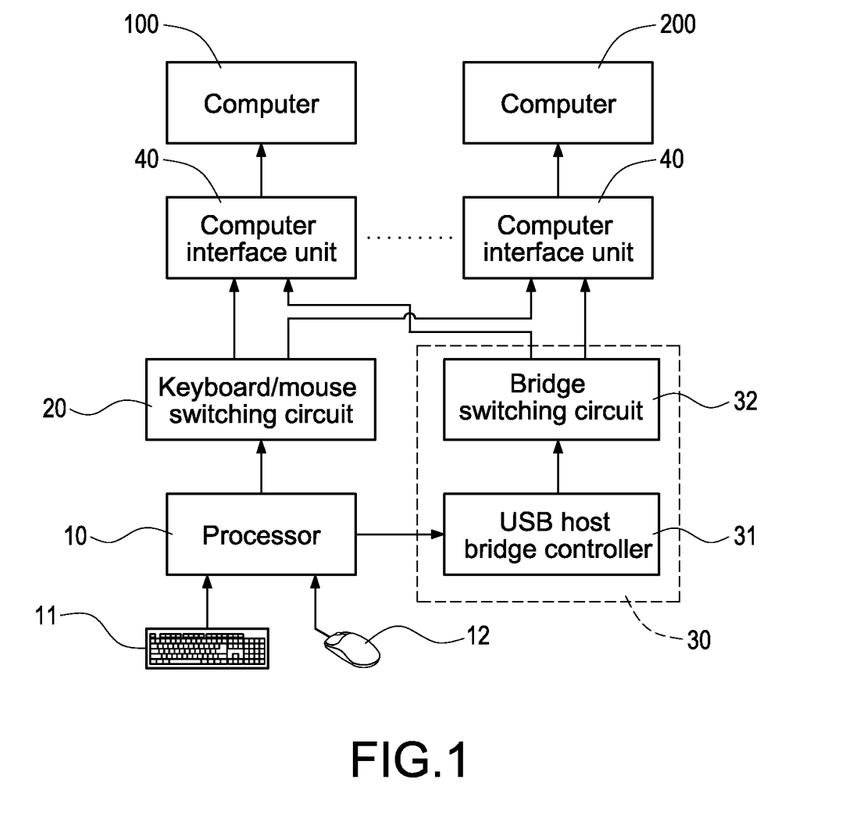
FIG. 1 shows the block diagram of the KVM switch apparatus with bridging function according to the present invention.
Figure 2:
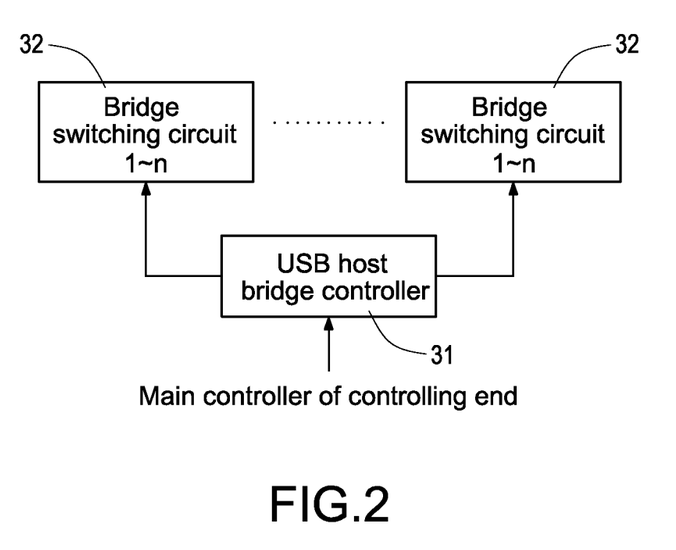
FIG. 2 depicts a switch selection of computer port.
Figure 3:
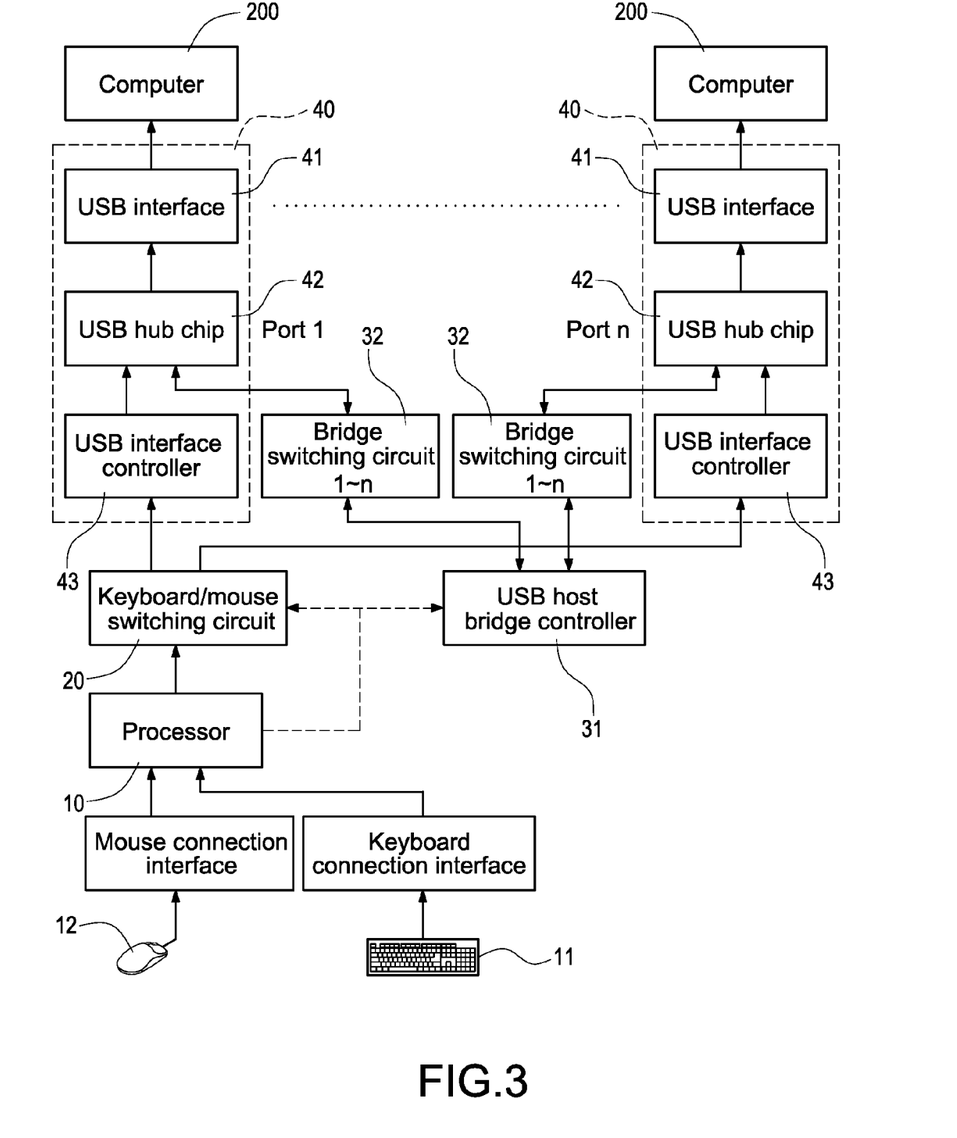
FIG. 3 is a detailed block diagram for KVM switch apparatus with bridging function according to the present invention.

With reference to FIGS. 1 to 3, where FIG. 1 shows the block diagram of the KVM switch apparatus with bridging function according to the present invention; FIG. 2 depicts a switch selection of computer port; and FIG. 3 is a detailed block diagram for KVM switch apparatus with bridging function according to the present invention.

The KVM (keyboard-video-mouse) switch apparatus with bridging function and enabling mouse cursor to move cross multiple monitors mainly comprises a processor 10, a keyboard/mouse switching circuit 20, a USB bridge unit 30 and at least one computer interface unit 40.

The processor 10 comprises a keyboard connection interface (not shown) and a mouse connection interface (not shown), where the keyboard connection interface and the mouse connection interface are for example but not limited to, USB interface or PS/2 interface. Through the keyboard connection interface and the mouse connection interface, the processor 10 is respectively connected to a keyboard 11 and a mouse 12. The keyboard 11 and the mouse 12 are well-known art and the detailed description thereof is omitted here.

The keyboard/mouse switching circuit 20 is electrically connected to the processor 10 and comprises a plurality of first switching units 1~n for switching a connection to the keyboard 11 and the mouse 12. Moreover, the number of the first switching units 1~n of the keyboard/mouse switching circuit 20 can be changed according to practical need.

The USB bridge unit 30 is electrically connected to the processor 10, and comprises a USB host bridge controller 31 and a bridge switching circuit 32. The USB host bridge controller 31 is electrically connected to the processor 10 and deals with the communication between two bridged computers 100 and 200, whereby the computer 100 can control the computer 200 and vice versa. The example in FIG. 1 is demonstrated by two computers 100 and 200 and this is not limitation for the scope of the present invention. The bridge switching circuit 32 is electrically connected to the USB host bridge controller 31 and the computer interface units 40 of the computers 100 (200), whereby the bridge switching circuit 32 can provide channel switching for the computers 100 and 200.

The bridge switching circuit 32 further comprises a plurality of second switching units 1~n therein to provide channel selection for the computers 100 and 200. The number of the second switching units 1~n, for example, can be the same as that of the first switching units in the keyboard/mouse switching circuit 20. However, it is not the limitation for the number of the second switching units, which can be adjusted according to practical need.

The computer interface 40 is electrically connected to the processor 10 and the USB bridge unit 30 and used for linking to at least one of computers 100 and 200. The computer interface unit 40 further comprises a USB interface 41, a USB hub chip 42, and a USB interface controller 43. The USB interface 41 is electrically connected to the computer 100 or the computer 200. The USB hub chip 42 is electrically connected to the USB interface 41 for providing USB signal regeneration. The USB interface controller 43 is electrically connected to the USB hub chip 42 and further electrically connected to the keyboard/mouse switching circuit 20 and the bridge switching circuit 32, respectively, to provide USB interface signal processing function.

The KVM switch apparatus with bridging function according to the present invention further comprises a printed circuit board (not shown) and a casing (not shown). The printed circuit board is used to mount the processor 10, the keyboard/mouse switching circuit 20, the USB bridge unit 30 and the computer interface unit 40 and so on. The casing is used to enclose and protect all elements mounted on the printed circuit board. The printed circuit board and the casing are well know art for KVM switch, and the detailed description is omitted here for clarity.

As shown in FIGS. 2 and 3, in the KVM switch apparatus according to the present invention, the keyboard/mouse switching circuit 20 and the bridge switching circuit 32 are selectively connected, whereby the USB host bridge controller 31 provides selection of bridging channels between the two computers 100 and 200. Therefore, data transmission and resource sharing can be provided between any two computers 100 and 200. In this regard, the KVM switch apparatus according to the present invention is much advanced than prior art KVM switch apparatus.

Figure 4:
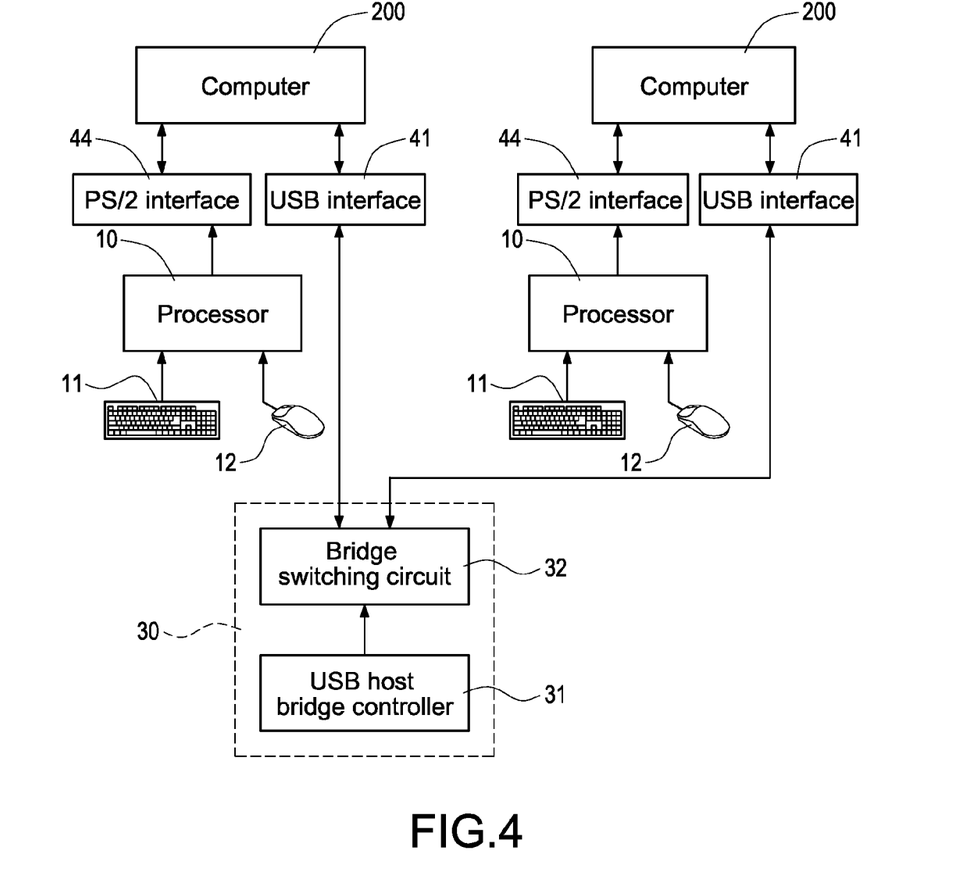
FIG. 4 shows the computer interface unit according to another embodiment of the present invention.

FIG. 4 shows another embodiment of the present invention, where the computer interface unit 40 further comprises a PS/2 interface 44. As shown in this figure, the PS/2 interface 44 provides connection for a PS/2 keyboard 11 or a PS/2 mouse 12. The remaining portions in this figure have similar operation as previous example, and the description is omitted here for clarity.

Figure 5:
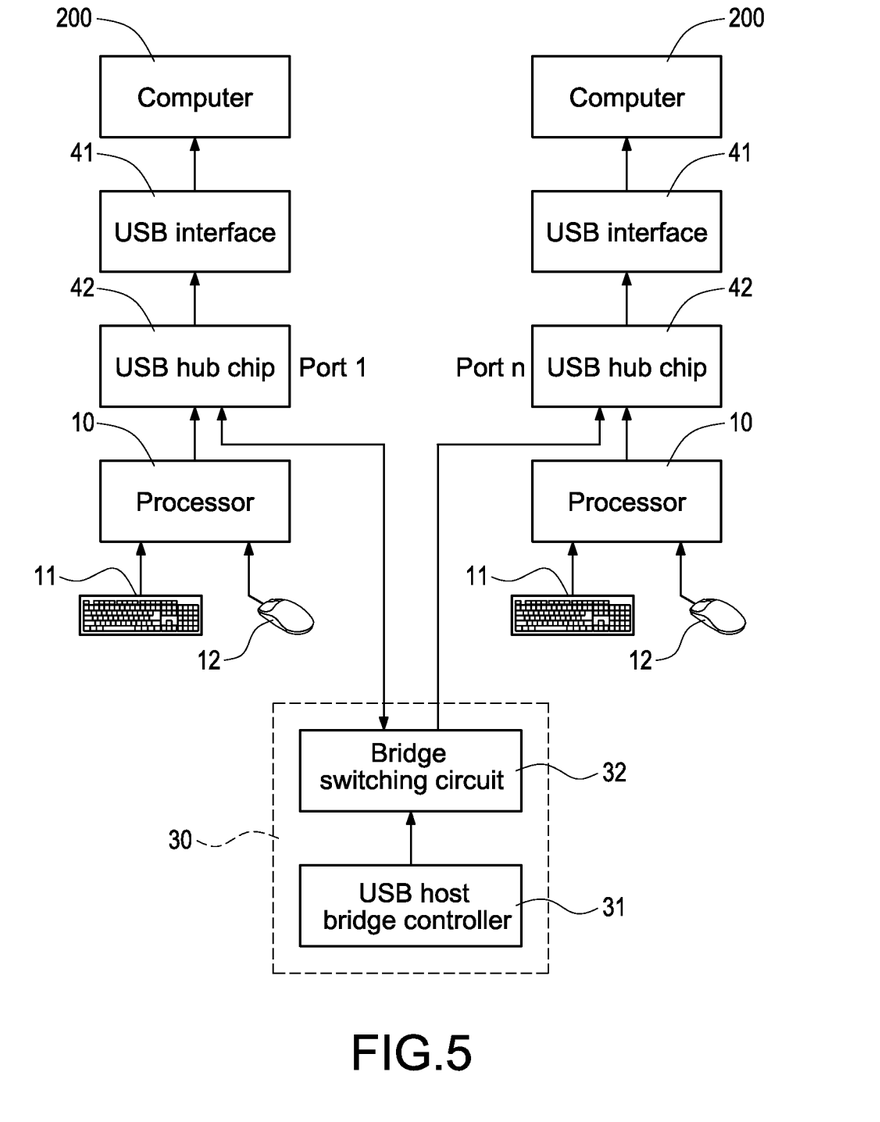
FIG. 5 shows still another embodiment of the present invention.

FIG. 5 shows still another embodiment of the present invention, where the KVM switch apparatus according to the present invention further comprises a circuit (not shown) for PS/2 to USB interface conversion. Therefore, the signal from an external PS/2 keyboard 11 or PS/2 mouse 12 is converted to USB signal and then sent to the USB interface controller 43 for further processing.

Moreover, the present invention also provides a KVM switch apparatus enabling mouse cursor to move cross multiple monitors. Please refer to FIGS. 1 and 6, where FIG. 6 demonstrates the automatic switching the mouse cursor when the mouse cursor is moving cross multiple monitors in rightward direction. The KVM switch apparatus enabling mouse cursor to move cross multiple monitors comprises the processor 10, the keyboard/mouse switching circuit 20 and the computer interface units 40 as shown in FIG. 1. The processor 10 further comprises a keyboard connection interface (not shown) and a mouse connection interface (not shown).

Figure 6:
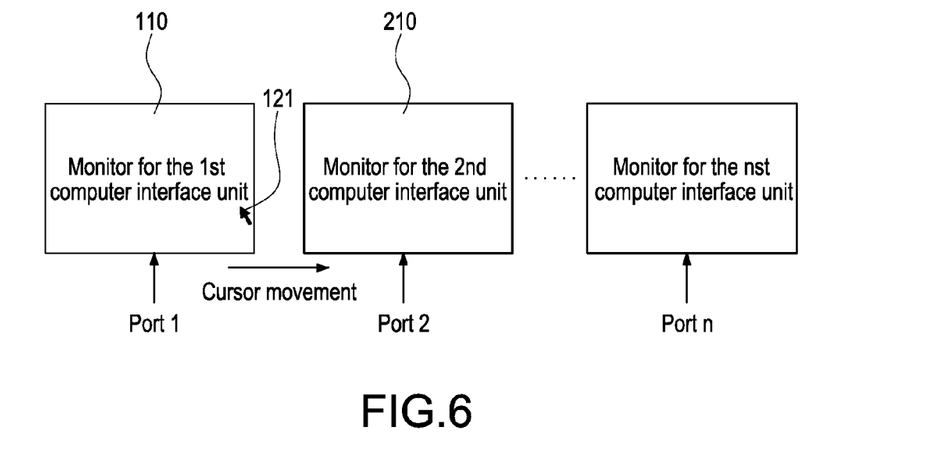
FIG. 6 demonstrates the automatic switching the mouse cursor when the mouse cursor is moving cross multiple monitors in rightward direction.

The processor 10 is installed with a system driver (not shown) and each of the computer interface units 40 is electrically connected to one corresponding computer 100, where each computer 100 has a monitor 110. The keyboard connection interface and the mouse connection interface are electrically connected to a keyboard 11 and a mouse 12, respectively. The KVM switch apparatus enabling mouse cursor to move cross multiple monitors is characterized in followings. When the mouse cursor 121 is moved to the rightmost edge of the monitor 110 of the computer 100 connected to the computer interface unit 40, the system driver sends an absolute address of the mouse cursor 121 and an indication that the mouse cursor 121 reaches the rightmost edge to the processor 100. Afterward, the processor 10 controls the keyboard/mouse switching circuit 20 to the second computer interface unit 40, and the mouse cursor 121 is placed to the leftmost edge of the monitor 210 of the computer 200 connected to the second computer interface unit 40, where the monitor 210 is on the right side of the monitor 110. Therefore, user can directly control the computer 100 and 200 by the keyboard 11 and the mouse 12 with the computer interface units 40.

The keyboard connection interface (not shown) and a mouse connection interface (not shown) are, for example but not limited to, USB interface or PS/2 interface. Moreover, the processor 10 further comprises circuit (not shown) for PS/2 to USB interface conversion and the detailed description can be referred to preceding paragraphs.

Figure 7:
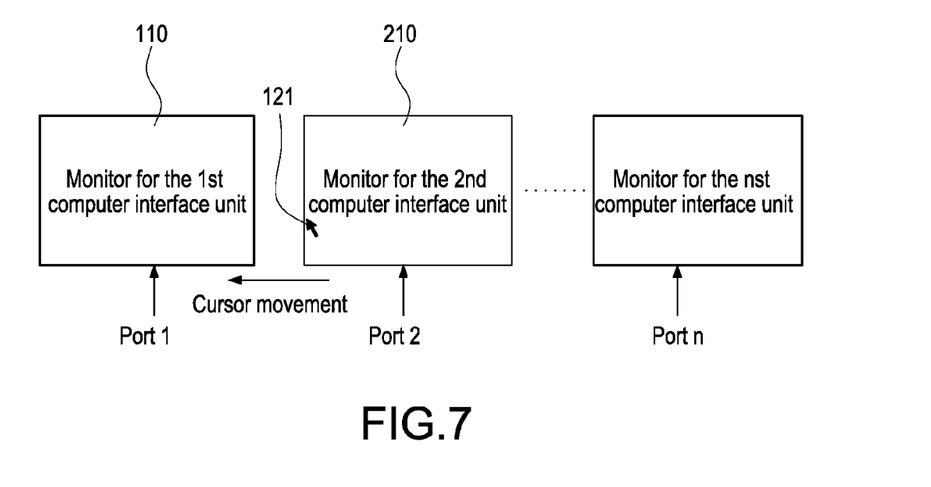
FIG. 7 demonstrates the automatic switching the mouse cursor when the mouse cursor is moving cross multiple monitors in leftward direction.

Please refer to FIGS. 1 and 7, where FIG. 7 demonstrates the automatic switching the mouse cursor when the mouse cursor is moving cross multiple monitors in leftward direction.

The KVM switch apparatus enabling mouse cursor to move cross multiple monitors is characterized in followings. When the mouse cursor 121 is moved to the leftmost edge of the monitor 210 of the computer 200 connected to the second computer interface unit 40, the system driver sends an absolute address of the mouse cursor 121 and an indication that the mouse cursor 121 reaches the leftmost edge to the processor 100. Afterward, the processor 10 controls the keyboard/mouse switching circuit 20 to the first computer interface unit 40, and the mouse cursor 121 is placed to the rightmost edge of the monitor 110 of the computer 100 connected to the first computer interface unit 40, where the monitor 110 is on the left side of the monitor 210. Therefore, user can directly control the computer 100 and 200 by the keyboard 11 and the mouse 12 with the computer interface units 40.

Accordingly, the KVM switch apparatus with bridging function according to the present invention can provide switching of bridging channels between any two computers. Therefore, any two computers can establish point-to-point connection for resource sharing. Moreover, the KVM switch apparatus according to the present invention enables mouse cursor to move cross multiple monitors.

Figure 8:
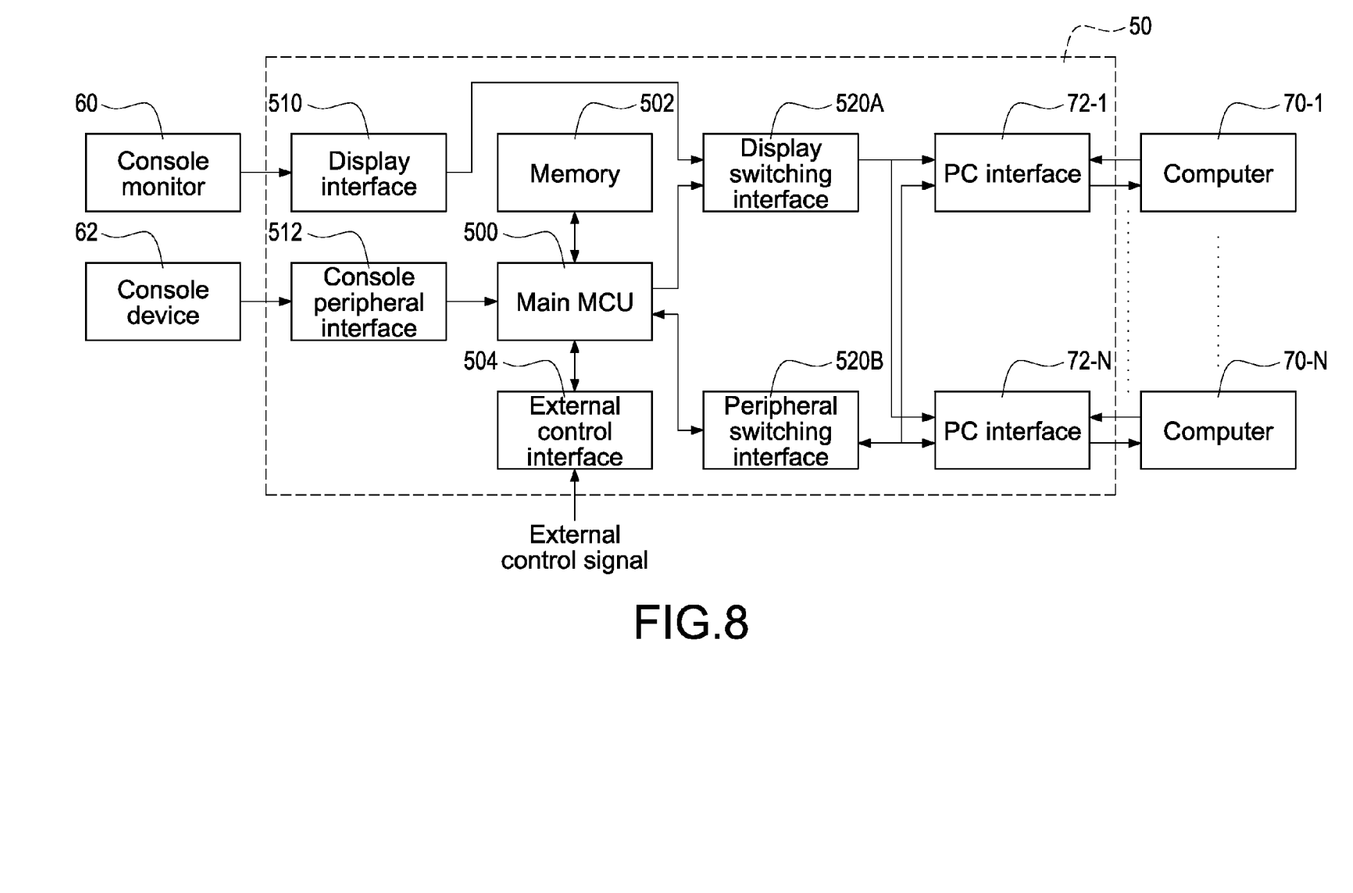
FIG. 8 schematically shows the block diagram of a KVM switch apparatus for implementing the KVM switching method of the present invention.
Figure 9:
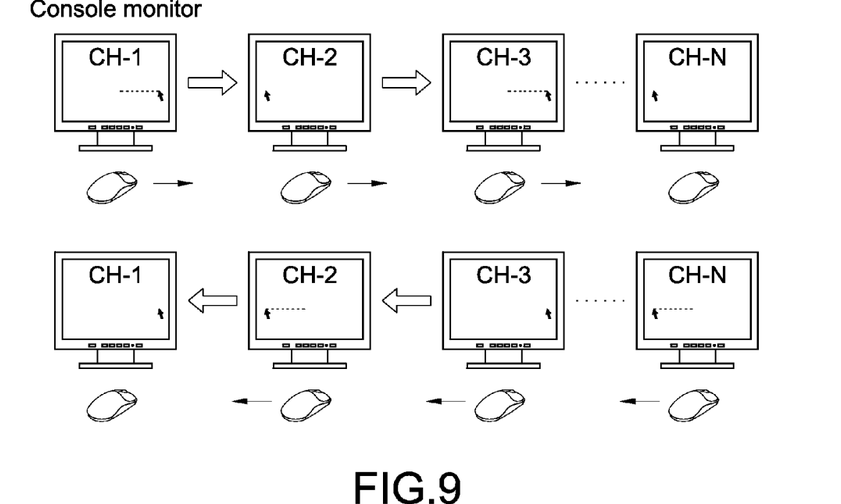
FIG. 9 demonstrates the operation of the KVM switch apparatus shown in FIG. 8.

According to another aspect of the present invention, a KVM switching method with synergy control function is also proposed. FIG. 8 schematically shows the block diagram of a KVM switch apparatus 50 for implementing the KVM switching method of the present invention. As shown in FIG. 8, the KVM switch apparatus 50 mainly comprises a main MCU (micro controller unit) 500, a memory 502, an external control interface 504, a display interface 510 for connecting to a console monitor 60, an interface unit 512 for connecting to at least one console device 62. The KVM switch apparatus 50 is connected to a plurality of different computers 70-1, . . . , 70-N through a display switching interface 520A, and a peripheral switching interface 520B and a plurality of PC interfaces 72-1, . . . 72-N, respectively. With reference to FIG. 9, this figure demonstrates the operation of the KVM switch apparatus 50 shown in FIG. 8. The computers 70-1, . . . , 70-N are assigned with channel number CH-1, . . . , CH-N respectively to identify their operation sequence. The console device 62 is, for example, a computer mouse 62. As shown in FIG. 9, the console monitor 60 initially displays the screen of the computer 70-1 (corresponding to CH-1, the first one in the operation sequence and is referred to as the active computer to distinguish it with other computers). When the cursor (namely mouse coordinate) moves to the right edge of the console monitor 60 by operating the computer mouse 62, the main MCU 500 detects this edge-reaching condition and switches the connections of the console monitor 60 and the computer mouse 62 to the computer 70-2 (corresponding to CH-2, the next one in the operation sequence). The cursor then appears at the left edge of the console monitor 60, which is operated with the computer 70-2 corresponding to CH-2. As the mouse 62 moves rightward further, the cursor also moves rightward in the screen corresponding to the computer 70-2 until it touches the right edge of the console monitor 60 again. In this manner, the screen can be switched to those computers corresponding to CH-3, CH-4 . . . and so on by keeping moving the mouse rightward. In this way, the active computer becomes the second computer 70-2, the third computer 70-3 and so on by keeping moving the mouse rightward.

Similarly, as shown in bottom part of FIG. 8, the console monitor 60 initially displays the screen for the computer 70-N (corresponding to CH-N). When the cursor moves to the left edge of the console monitor 60 by operating the mouse 62, the main MCU 500 detects this edge-reaching condition and switches the connections of the console monitor 60 and the computer mouse 62 to the computer corresponding to CH-(N-1). In this manner, the screen can be switched to those computers corresponding to CH-(N-2), CH-(N-3) . . . CH-1 by keeping moving the mouse leftward. Therefore, user can select a specific computer among the computers 70-1, . . . , 70-N as an active computer to operate by moving the computer mouse 62 laterally (leftward or rightward).

Figure 10:
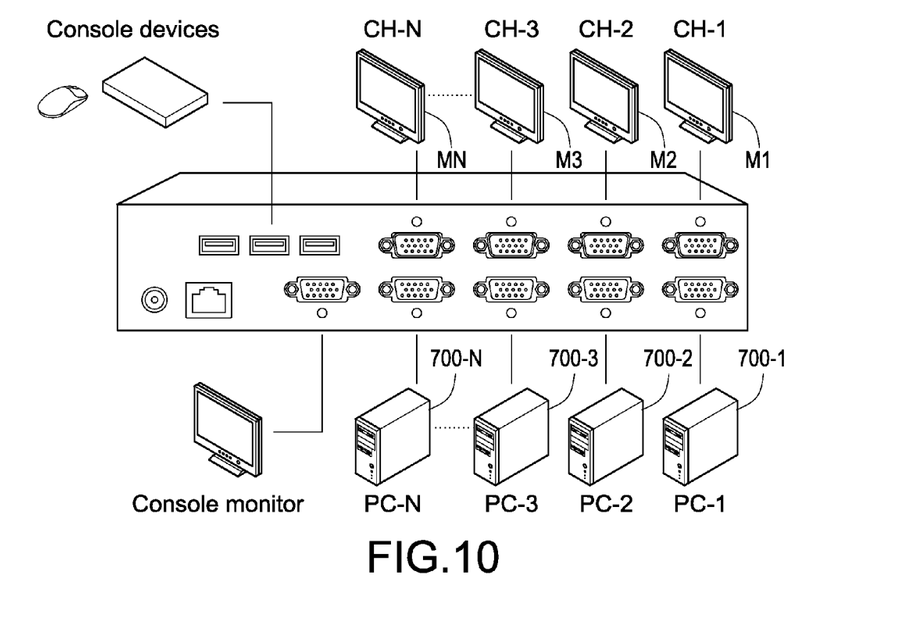
FIG. 10 shows the schematic diagram of KVM switching method with synergy control function for multi-monitors application.

Moreover, FIG. 10 shows the schematic diagram of KVM switching method with synergy control function, which is used for multi-monitors application. More particularly, a plurality of monitors M1, M2 . . . MN are electrically connected to the KVM switch apparatus 50, and corresponding to the computers 70-1 . . . 70-N, respectively. When the MCU 500 switches the connections of the console monitor 60 and the computer mouse 62 from CH-1 to CH-2, the operation screen for the computer 70-2 is also switched to the monitor M2 in additional to switch to the console monitor 60. In this situation, the remaining monitors M1, M3 . . . other than the active monitor M2 can display the screen for the computer 70-1, 70-3 . . . and so on, but the remaining monitors M1, M3 . . . cannot be used for the operation of the computer mouse 62.

Figure 11:
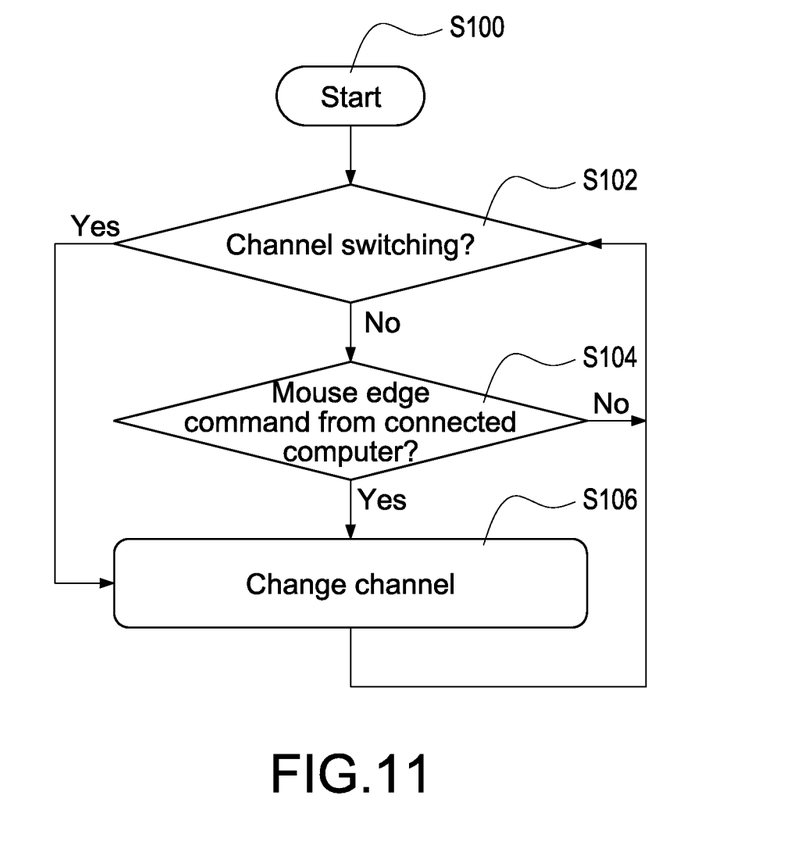
FIG. 11 shows the flowchart of KVM switching method with synergy control function.

FIG. 11 shows the flowchart of KVM switching method with synergy control function. With reference to FIG. 8 again, a mouse synergy driver program is first installed in each of the computers 70-1 . . . 70-N. After the process starts, a condition for judging channel switching is performed in step S102, where the command for channel switching is sent by an external control signal to the external control interface 504. The external control signal is generated, for example, by pressing a button (not shown) on the console monitor 60. Therefore, user can manually switch the connection of the console monitor 60 to a next computer without involving the operation of the computer mouse 62. After, the active computer will inform the console 50 that the cursor moves to the left/right edge of display screen through the mouse synergy driver program (Step S104). For example, the computer 70-1 sends a feedback command through the PC interface 72-1 and the peripheral switching interface 520B. The MCU 500 performs a channel switching action such that the console monitor 60 is operatively connected to the computer 70-2 through the a display interface 510, the display switching interface 520A and the PC interface 72-2 (Step S106). Therefore, the MCU 500 can detect that the cursor (mouse coordinate) arrives edge of the screen for the console monitor 60, no matter whether the computers 70-1 . . . 70-N have the same resolution.

Figure 12:
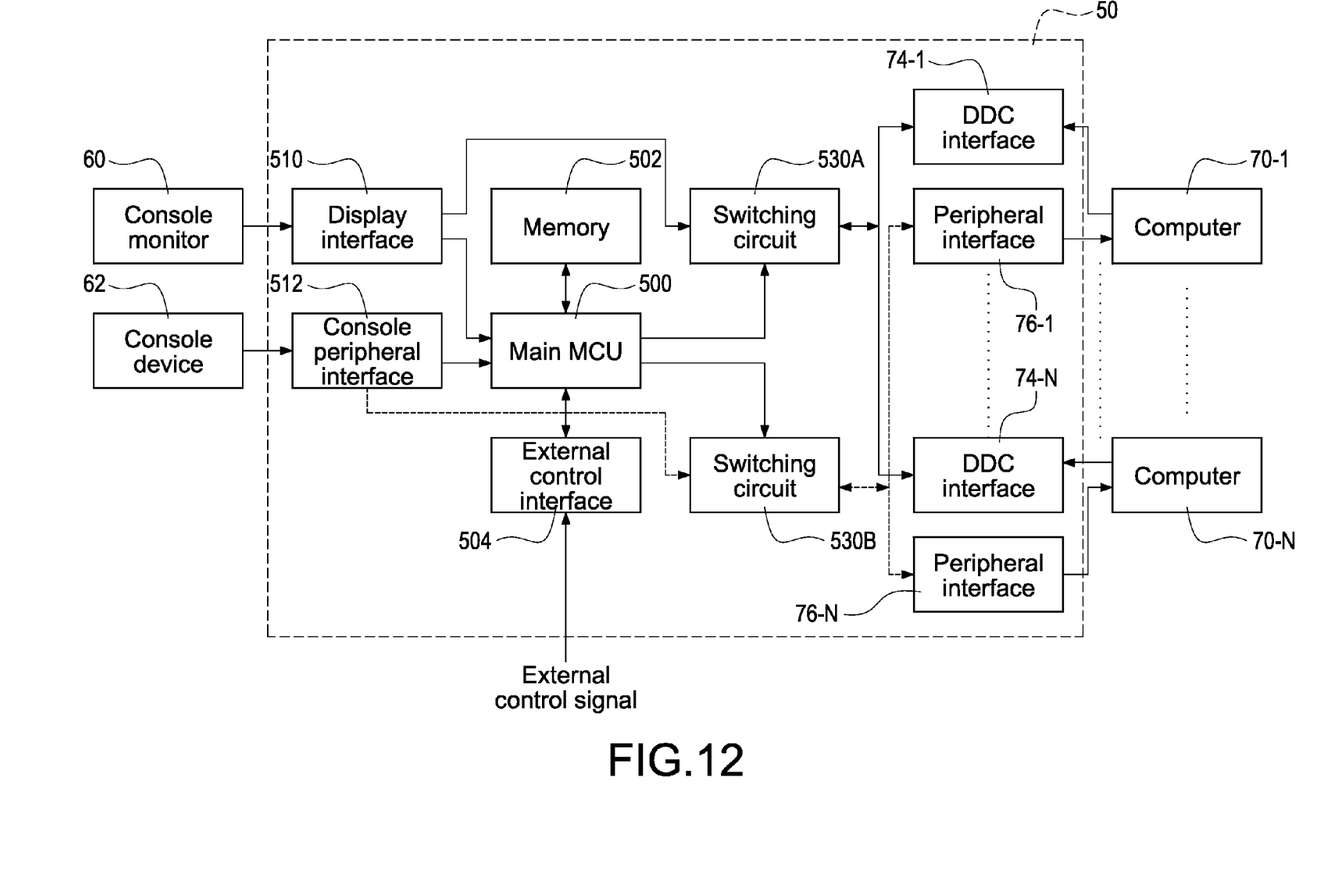
FIG. 12 schematically shows the block diagram of a KVM switch apparatus for implementing the KVM switching method of according to another preferred embodiment of the present invention.

FIG. 12 schematically shows the block diagram of a KVM switch apparatus for implementing the KVM switching method of according to another preferred embodiment of the present invention. This embodiment is similar to that of FIG. 8 and the same elements use the same numerals. In this embodiment, the MCU 500 reads EDID (extended display identification data) of the console monitor 60 through the display interface 510 and then copies the EDID of the console monitor 60 to the DDC (display data channel) interfaces 74-1, . . . , 74-N of the computers 70-1, . . . , 70-N. Therefore, all of the computers 70-1, . . . , 70-N have the same display setting including screen resolution corresponding to the EDID of the console monitor 60. The MCU 500 calculates the mouse coordinate in an active screen (for example, the screen corresponding to computer 70-1) according to the resolution of the computer mouse 62, the operation of the computer mouse 62 and the EDID of the console monitor 60. When the cursor reaches the right edge of the screen corresponding to computer 70-1, the MCU 500 switches the connections of the console monitor 60 and the computer mouse 62 from CH-1 to CH-2. Afterward, the MCU 500 recalculates the mouse coordinate in the active screen (namely, the screen corresponding to computer 70-2) according to the resolution of the computer mouse 62, the operation of the computer mouse 62 and the EDID of the console monitor 60.

Figure 13:
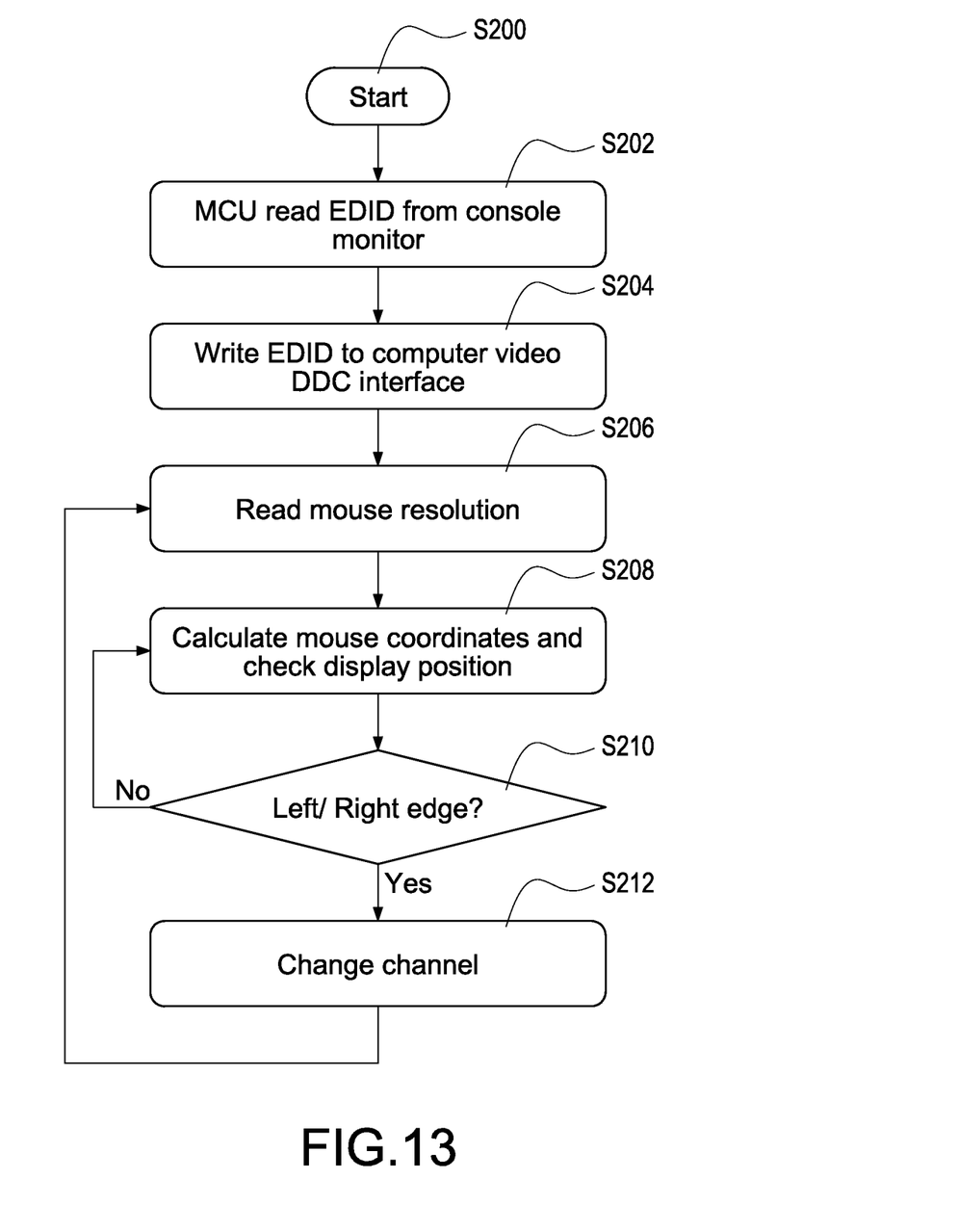
FIG. 13 shows the flowchart of KVM switching method with synergy control function corresponding to FIG. 12.

FIG. 13 shows the flowchart of KVM switching method with synergy control function corresponding to FIG. 12. After the process starts, the MCU 500 reads EDID of the console monitor 60 through the display interface 510 (Step S202). The MCU 500 then writes the EDID of the console monitor 60 to the DDC (display data channel) interfaces 74-1, . . . , 74-N of the computers 70-1, . . . , 70-N (Step S204). The MCU 500 then reads the resolution of the computer mouse 62 (Step S206). The MCU 500 then calculates the coordinate of the mouse in an active screen according to the input of the computer mouse 62 and the EDID of the console monitor 60 in step S208 and checks whether the mouse coordinate reaches the left/right edge of the console monitor 60 in step S210. When the mouse coordinate reaches the left/right edge of the console monitor 60, the MCU 500 change the connection channel for the console monitor 60 and the computer mouse 62 in step S212. More particularly, the MCU 500 connects the console monitor 60 and the computer mouse 62 to a previous or a next computer to the active computer in step S212. By the KVM switching method of the present invention, the connection of the console monitor 60 to one of the multiple computers can be controlled in synergy fashion.

What is claimed is:

1. A method for KVM switching and synergy control, the method used to switch a connection of a console monitor to one of a plurality of different computers assigned with different channel numbers, the method comprising:
    installing a mouse synergy drive program in each of the computers;
    operatively connecting the console monitor to an active computer;
    detecting a mouse coordinate by the mouse synergy drive program installed in the active computer to inform whether a channel switching condition occurs; and
    operatively connecting the console monitor to a next computer with channel number adjacent to the active computer when the channel switching condition is detected.

2. The method in claim 1, wherein in step of detecting the channel switching condition occurs when an external command signal is sent.

3. The method in claim 1, wherein the step of detecting further comprises:
    the active computer detecting a mouse coordinate on the console monitor; and
    the active computer informing the channel switching condition when the mouse coordinate reaches lateral edge of the console monitor.

4. The method in claim 3, wherein the active computer detects that the mouse coordinate reaches a right edge of the console monitor, and the mouse coordinate appears at a left edge of the console monitor when the console monitor is operatively connected to the next computer.

5. The method in claim 1, wherein the active computer detects that the mouse coordinate reaches a left edge of the console monitor, and the mouse coordinate appears at a right edge of the console monitor when the console monitor is operatively connected to the next computer.

6. A method for KVM switching and synergy control, the method used to switch a connection of a console monitor to one of a plurality of different computers assigned with different channel numbers, the method comprising:
    reading extended display identification data (EDID) of the console monitor;
    writing EDID to a display data channel (DDC) interface for each of the computers;
    reading a resolution of a computer mouse operatively connected to an active computer, wherein the console monitor is also operatively connected to the active computer;
    calculating a mouse coordinate for the computer mouse and determining whether the mouse coordinate is corresponding to an edge of the console monitor with reference to the EDID; and
    operatively connecting the console monitor and the computer mouse to a next computer with channel number adjacent to the active computer when the mouse coordinate is corresponding to the edge of the console monitor, and the mouse coordinate appearing at an opposite edge of the console monitor when the console monitor is operatively connected to the next computer.

7. The method in claim 6, wherein the mouse coordinate is corresponding to a right edge of the console monitor, and the mouse coordinate appears at a left edge of the console monitor when the console monitor is operatively connected to the next computer.

8. The method in claim 6, wherein the mouse coordinate is corresponding to a left edge of the console monitor, and the mouse coordinate appears at a right edge of the console monitor when the console monitor is operatively connected to the next computer.

9. The method in claim 6, wherein all the computers have the same display setting according to the EDID of the console monitor.

10. The method in claim 6, further comprising calculating the mouse coordinate according to the resolution of the computer mouse and the EDID.

* * * * *